US012750653B2

(12) United States Patent
Zhang et al.

(10) Patent No.: US 12,750,653 B2
(45) Date of Patent: Sep. 29, 2026

(54) SYSTEMS AND METHODS FOR COMMUNICATION NODE STATUS INFORMATION INDICATION AND ACQUISITION

(71) Applicant: ZTE CORPORATION, Shenzhen (CN)

(72) Inventors: Nan Zhang, Shenzhen (CN); Fangyu Cui, Shenzhen (CN); Yuan Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 800 days.

(21) Appl. No.: 17/887,052

(22) Filed: Aug. 12, 2022

(65) Prior Publication Data

US 2023/0007463 A1 Jan. 5, 2023

Related U.S. Application Data

(63) Continuation of application No. PCT/CN2020/075281, filed on Feb. 14, 2020.

(51) Int. Cl.
*H04W 8/08* (2009.01)

(52) U.S. Cl.
CPC .................................... *H04W 8/08* (2013.01)

(58) Field of Classification Search
CPC ... H04W 8/08; H04W 64/003; H04W 72/569; H04W 72/21; H04L 67/12; H04B 7/2612
See application file for complete search history.

(56) References Cited

U.S. PATENT DOCUMENTS

2014/0274060 A1* 9/2014 Fujishiro ................ H04W 8/14
2017/0064764 A1 3/2017 Ke et al.
2019/0280937 A1 9/2019 Barritt
2019/0313357 A1* 10/2019 Wang ............... H04W 56/0045
(Continued)

FOREIGN PATENT DOCUMENTS

CN 106375276 A 2/2017
CN 108242951 A 7/2018
(Continued)

OTHER PUBLICATIONS

Ericsson (Email Discussion Rapporteur): "Report of email discussion [107bis#67] [N R—NTN]", 3GPP Draft; Tdoc R2-1916391, 3GPP TSG-RAN WG1 Meeting#108, Reno, United States, Nov. 23, 2019 (15 pages).

(Continued)

*Primary Examiner* — Charles C Jiang
(74) *Attorney, Agent, or Firm* — Foley & Lardner LLP

(57) ABSTRACT

Systems and methods for wireless communications are disclosed herein. In some embodiments, a wireless communication method for wireless communication between a first communication node and a second communication node includes obtaining, by the second communication node, status information related to the first communication node. In some embodiments, a wireless communication method for wireless communication between a first communication node and a second communication node includes transmitting, by the first communication node to the second communication node, status information related to the first communication node.

18 Claims, 11 Drawing Sheets

300

| Bit field | Types or content |
|---|---|
| 00 | Not Available |
| 01 | Satellite/Mode-1 |
| 10 | HAPS/Mode-2 |
| 11 | Reserved |

(56) References Cited

U.S. PATENT DOCUMENTS

| | | | | |
|---|---|---|---|---|
| 2020/0314914 | A1* | 10/2020 | Roy | H04W 74/006 |
| 2021/0184758 | A1* | 6/2021 | Barritt et al. | H04B 7/18504 |
| 2022/0110049 | A1* | 4/2022 | Wang | H04W 48/16 |
| 2022/0191819 | A1* | 6/2022 | Ratasuk et al. | H04W 4/025 |

FOREIGN PATENT DOCUMENTS

| | | | | |
|---|---|---|---|---|
| CN | 108282812 A | | 7/2018 | |
| WO | WO-2021057490 A1 | * | 4/2021 | H04B 7/10 |
| WO | WO-2021168485 A1 | * | 8/2021 | H04W 48/12 |

OTHER PUBLICATIONS

Extended European Search Report on EP Appl No. 20 890 918.4, dated Apr. 26, 2023 (14 pages).
LG Electronics Inc: "Report on email discussion [107#64][NTN] Cell Selection & reselection", 3GPP Draft; R2-1914070, 3GPP TSG-RAN WG1 Meeting#107bis, Chongqing, China, Oct. 18, 2019 (21 pages).
Nokia et al: "Doppler Compensation, Uplink Timing Advance, Random Access and UE Location in NTN", 3GPP Draft; R1-1911220, 3GPP TSG-RAN WG1 Meeting#98bis Chongqing, China, Oct. 5, 2019 (30 pages).
Nomor Research Gmbh: "System Information in NTN", 3GPP Draft; R2-1915543, 3GPP TSG-RAN WG1 Meeting#108, Reno, United States, Nov. 7, 2019 (6 pages).
ZTE Corporation, et al: "Utilization of the ephemeris information in cell selection and re-selection", 3GPP Draft; R2-1909261, 3GPP TSG-RAN WG1 Meeting#107, Prague, Czech, Aug. 15, 2019 (3 pages).
International Search Report and Written Opinion for PCT Appl. No. PCT/CN2020/075281 mailed Oct. 27, 2020 (8 pages).
First Office Action for CN Appl. No. 202080080889.2, dated Jul. 1, 2025 (with English translation, 18 pages).
Office Action for KR Appl. No. 10-2022-7027969, dated Jul. 18, 2025 (with English translation, 15 pages).

* cited by examiner

200b

| | | |
|---|---|---|
| Orbital-Plane Parameters | $\sqrt{a}$ | Square root of semi major axis (semi-major axis) |
| | $e$ | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite-Level Parameters | $M_0$ | Mean anomaly at reference time (true anomaly and a reference point in time) |
| | $t_{0e}$ | Ephemeris reference time (the epoch) |

FIG. 2B

300

| Bit field | Types or content |
|---|---|
| 00 | Not Available |
| 01 | Satellite/Mode-1 |
| 10 | HAPS/Mode-2 |
| 11 | Reserved |

FIG. 3

SYSTEMS AND METHODS FOR COMMUNICATION NODE STATUS INFORMATION INDICATION AND ACQUISITION

CROSS-REFERENCE TO RELATED APPLICATION

This application claims the benefit of priority under 35 U.S.C. § 120 as a continuation of PCT Patent Application No. PCT/CN2020/075281, filed on Feb. 14, 2022, the disclosure of which is incorporated herein by reference in its entirety.

TECHNICAL FIELD

The present disclosure relates to the field of telecommunications, and in particular, to communication node status information indication and acquisition.

BACKGROUND

With the developments in wireless communications, system architectures having improved flexibility such as but not limited to, Self-Organizing Networks (SON), can be implemented based on different levels of components for example, with lower-layer splits of nodes (e.g., gNB). In addition, to support 3-D wireless communication networks, new use cases involving BS or partial BS located on satellites, High-Altitude Platform Stations (HAPS), and so on have been proposed. Moreover, sidelink has been proposed to support communications among vehicles (e.g., vehicle-to-vehicle (V2V), vehicle-to-everything (V2X), and so on) and between mobile phones to wearable devices. All such proposals involve one or more communications nodes that may be in motion.

Base Station (BS) status information or network information refers to information regarding location and/or movement status of base stations of a wireless communication network. Traditionally, the BS status information is unknown to User Equip (UE) side due to safety considerations.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication method for wireless communication between a first communication node and a second communication node includes obtaining, by the second communication node, status information related to the first communication node.

In some embodiments, a wireless communication method for wireless communication between a first communication node and a second communication node includes transmitting, by the first communication node to the second communication node, status information related to the first communication node.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2B is a table illustrating parameters defining an orbit dedicated to a satellite, in accordance with some embodiments of the present disclosure.

FIG. 3 is a table illustrating an example bit field and information corresponding thereto, in accordance with some embodiments of the present disclosure.

DETAILED DESCRIPTION OF EXAMPLE EMBODIMENTS

Figure 1A:
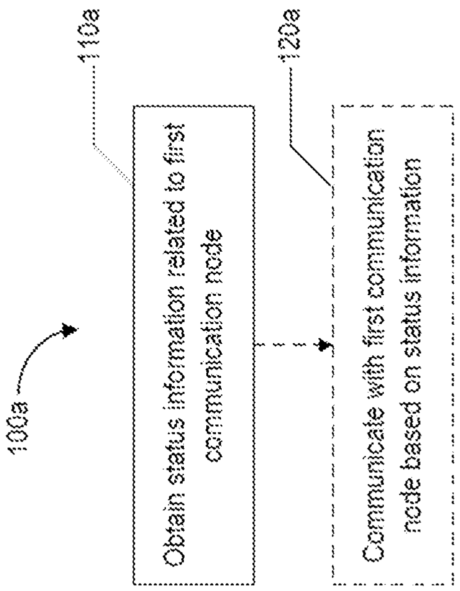
FIG. 1A is a flow diagram illustrating a wireless communication method for wireless communication between a first communication node and a second communication node, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

To support architectures (e.g., SON, 3-D wireless communication networks, sidelinks, and so on) that involve communication nodes that may be moving and/or that may be located in high-altitude, additional, complicated designs over the physical layer may be needed according to existing specification. For example, a significant number of additional Reference Signals (RS), synchronization mechanisms, and coordination mechanisms may be needed under the existing network specification.

The embodiments disclosed herein relate to mechanisms for a BS to provide BS status information or network information indication to a UE (e.g., a wireless communication device) or to a peer entity (e.g., another BS or a partial BS). The disclosed mechanisms have designs that are more simplified as compared to those involving additional RS, synchronization mechanisms, and coordination mechanisms.

As used herein, a communication node refers to any device capable of communicating wirelessly. Examples of the communication node include but are not limited to, a BS, a relay node, a UE (a wireless communication device, such as a mobile phone), and so on. As used herein, a Type-A communication node (a first communication node) refers to any communication node that transmits its status information via signaling. The Type-A communication node can be moving (relative to a given position on the surface of the Earth) or stationary. The Type-A communication node can be terrestrial or part of a Non-Terrestrial Network (NTN). Examples of an Type-A communication node include any type of BS such as but not limited to, satellites (e.g., those in Low Earth Orbit (LEO)), HAPS (e.g., balloons, Unmanned Aerial Vehicles (UAVs), other suitable airborne vehicles, and so on), terrestrial vehicles (e.g., Unmanned Ground Vehicles (UGVs)), a maritime vehicles (e.g., Unmanned Maritime Vehicles (UMVs)), a traditional, stationary BS located on the surface of the earth, and so on. As used herein, a Type-B communication node (a second communication node) refers to any communication node that receives, from a Type-A communication node, status information of the Type-A communication node via signaling. Examples of the Type-B communication node include but are not limited to, a UE, a wireless communication device, a mobile device (e.g., a mobile phone), or a peer entity (e.g., a BS or a partial BS) of the Type-A communication node.

FIG. 1A is a flow diagram illustrating a wireless communication method 100*a* for wireless communication between a first communication node (e.g., a Type-A communication node) and a second communication node (e.g., Type-B communication node), in accordance with some embodiments of the present disclosure. The method 100*a* is performed by the second communication node. At 110*a*, the second communication node obtains status information related to the first communication node. Optionally, the second communication node communicates, with the first communication node, data based on the status information, at 120*a*.

Figure 1B:
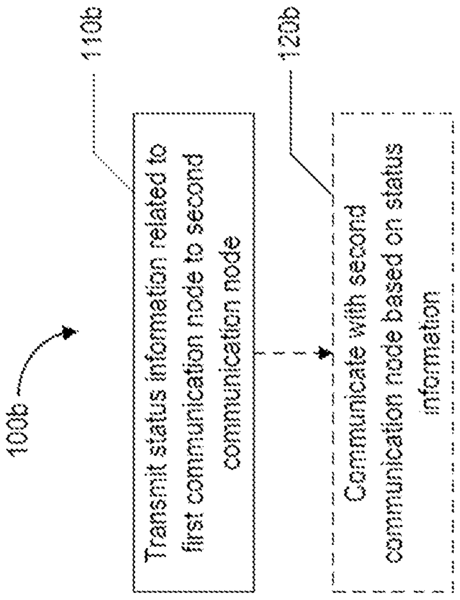
FIG. 1B is a flow diagram illustrating a wireless communication method for wireless communication between a first communication node and a second communication node, in accordance with some embodiments of the present disclosure.

FIG. 1B is a flow diagram illustrating a wireless communication method 100*b* for wireless communication between a first communication node (e.g., a Type-A communication node) and a second communication node (e.g., Type-B communication node), in accordance with some embodiments of the present disclosure. The method 100*a* is performed by the first communication node. At 110*b*, the first communication node transmits status information related to the first communication node to the second communication node. Optionally, the first communication node communicates, with the second communication node, data based on the status information, at 120*b*.

In some embodiments, the status information includes one or more parameters for at least one of location information of the first communication node or mobility status of the first communication node, where the status information is obtained by the second communication node at 110*a* or transmitted by the first communication node at 110*b*.

In some embodiments, the one or more parameters for the location information include one or more of (1) a location of the first communication node expressed in parameters (coordinates) of a coordinate system; (2) the location of the first communication node expressed in longitude, latitude, and height; (3) a predetermined path along which the first communication node is configured or planned to move; or (4) accuracy information.

With regard to the location of the first communication node expressed based on a coordinate system, the coordinate system can be any suitable coordinate system that can be used to indicate the location of the first communication node. In one example, the coordinate system includes a spherical coordinate system with an origin at the center of the Earth. In another example, the coordinate system includes a Cartesian coordinate system with any suitable origin (e.g., at the center of the earth). In yet another example, the coordinate system includes the Earth-Center, Earth-Fixed (ECEF) or Earth-Centered Rotational (ECR) coordinate system, which is a geographic and Cartesian coordinate system having the origin at the center of mass of the Earth. In that regard, the location information may include three parameters (coordinates), each corresponding to an axis of the coordinate system.

As described the location of the first communication node can be expressed in a geographic coordinate system that defines the location of the first communication node using longitude, latitude, and height (elevation). The height is determined with reference to a given point (e.g., geoid) on Earth. In that regard, the location information may include three parameters, one for each of longitude, latitude, and height.

The second communication node can determine a location/position of the first communication node at any given time using the predetermined path along which the first communication node is configured or planned to move. In that regard, the location information may include parameters that indicate locations (expressed using suitable coordinate systems) along the predetermine path that the first communication node can be, as well as, in some cases, an expect time at which the first communication node can be at each of those locations. A number of locations defined along the predetermine path can be configured based on suitably granularity. Accordingly, the second communication node can obtain the parameters associated with the predetermined path in advance and can determine the locations of the first communication node at later times without having to request updates with regard to the current location of the first communication node every time the second communication node needs to determine the current location of the first communication node. In some examples, the first communication node may receive correction data or updates relative to the predetermined path, where such correction data indicates to the second communication node the location of the first communication node if that location deviates from the predetermined path.

Examples of the predetermined path include but are not limited to, a trajectory, a flight path, or an orbit of the first communication node, in the cases in which the first communication node is a satellite. Examples of the predefined path include but are not limited to, a trajectory or a flight path of the first communication node, in the cases in which the first communication node is a movable HAPS (e.g., balloons, UAVs, other suitable airborne vehicles, and so on).

Figure 2A:
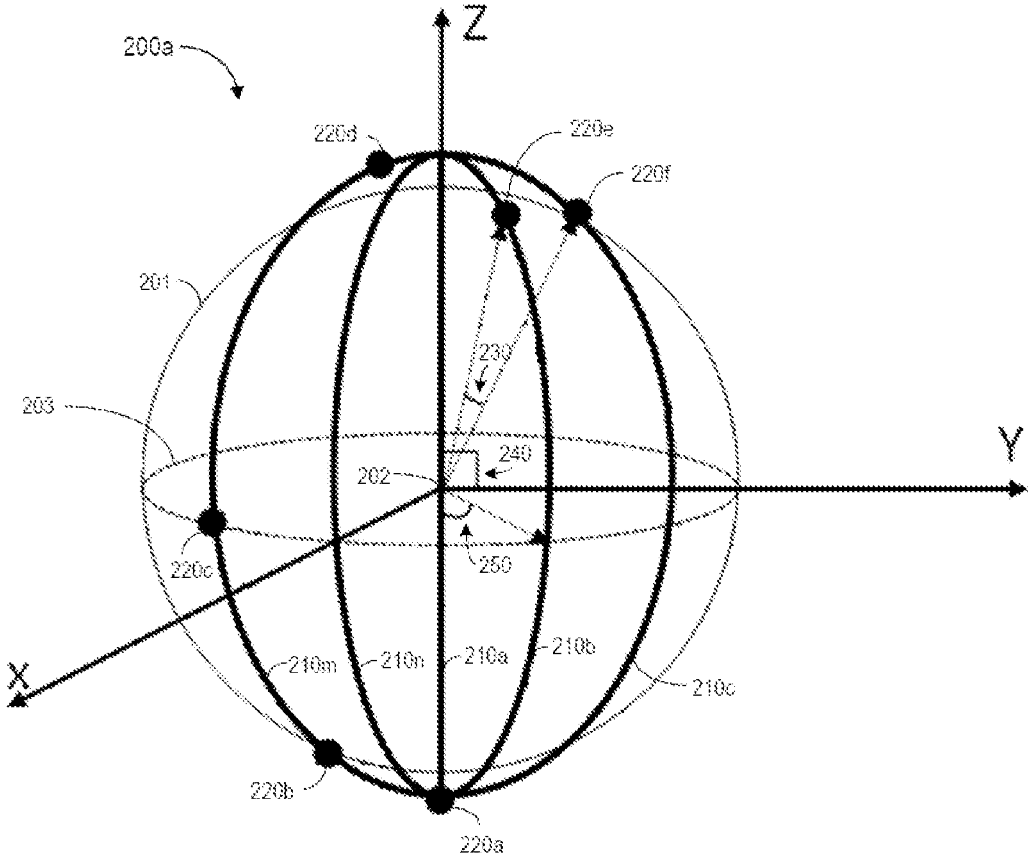
FIG. 2A is a schematic diagram illustrating a satellite ephemeris, in accordance with some embodiments of the present disclosure.

The parameters defining the predetermined path can be parameters that define an overall system (e.g., satellite ephemeris, an example of which is illustrated in FIG. 2A) and parameters that define a predetermined path dedicated to a given node (e.g., a predetermined path dedicated to a particular satellite, an example of which is illustrated in FIG. 2B).

FIG. 2A is a schematic diagram illustrating a satellite ephemeris 200, in accordance with some embodiments of the present disclosure. Referring to FIG. 2, the satellite ephemeris 200 includes parameters (e.g., orbital-level parameters) that provide information relating to multiple predetermined paths (e.g., N orbits 210*a*, 210*b*, 210*c*, . . . , 210*m*, and 210*n*) of multiple satellites 220*a*-220*f* (e.g., multiple first communication nodes) orbiting the Earth 201, which has a center 202 (e.g., the center of mass of the Earth 201) and an equatorial plane 203. Each of the orbits 210*a*, 210*b*, 210*c*, . . . , 210*m*, and 210*n* has a corresponding orbit plane. In particular, the orbital-level parameters include but are not limited to, a number of orbits (e.g., N), a number of satellites (e.g., the satellites 220*a*, 220*b*, 220*c*, and 220*d*) in a single orbit plane (e.g., the orbit plane corresponding to the orbit 210*m*), an inter-orbit plane satellite phasing angle (e.g., the inter-orbit plane satellite phasing angle 230 between the satellite 220*e* of the orbit 210*b* and the satellite 220*f* of the orbit 210*c*), an orbital plane inclination (e.g., an orbital plane inclination 240), a longitude difference between Right Ascension of the Ascending Node (RAAN) of adjacent orbital planes (e.g., a longitude difference between RAAN of adjacent orbital planes 250), and so on.

FIG. 2B is a table 200*b* illustrating parameters defining an orbit dedicated to a satellite, in accordance with some embodiments of the present disclosure. Referring to FIG. 2B, the table 200*b* includes parameters (e.g., orbital-plane parameters and satellite-level parameters) that provide information relating the dedicated orbit of the satellite. As shown, the orbital-plane parameters include a square root of semi-major axis (or semi-major axis) $\sqrt{a}$, eccentricity (e), inclination angle at reference time (or inclination) $i_0$, longitude of ascending node of orbit plane (or RAAN) $\Omega_0$, and argument of perigee (or argument of periapsis) $\omega$. The satellite-level parameters include mean anomaly at reference time (or true anomaly and a reference point in time) $M_0$ and ephemeris reference time (the epoch) $t_{0e}$.

The accuracy information notifies the second communication node a maximum possible margin of error for the location of the first communication node, where the errors may occurs due to gravity, wind, air resistance, time delays, and other unforeseeable interfering factors. In some embodiments, the accuracy information includes one or more of an error range, variation rate, a valid time duration, or an update periodicity. The accuracy information can be one single value or multiple values that each corresponds to a respective dimension, axis, parameters or perspective of a coordinate system or of a predetermined path.

In some embodiments, the error range is a single value that defines a boundary corresponding to a maximum possible margin of error for a location of the first communication node, where location is indicated by the parameters of the coordinate system, the combination of the longitude, latitude, and height, or the predetermined path. In the example in which the single value of the error range corresponds to a length of a radius or diameter, the boundary corresponds to a sphere having a center at the location of the first communication node (the location being indicated by the parameters of the coordinate system, the combination of the longitude, latitude, and height, or the predetermined path). The locations within the sphere are within the maximum possible margin of error.

In some embodiments, the error range is a value that defines a boundary corresponding to a maximum possible margin of error for each dimension, axis, parameters, or perspective of a coordinate system or of a predetermined path used to indicate a location of the first communication node. In the example in which the location of the first communication node is defined using three axes (e.g., of the spherical coordinate system, the Cartesian coordinate system, longitude/latitude/height, or coordinate systems similar thereto), the error range includes a first value that indicates a first maximum possible margin of error along a first axis, a second value that indicates a second maximum possible margin of error along a second axis, and a third value that indicates a third maximum possible margin of error along a third axis. Two or more of the third, second, and third values may be different in some examples.

In some embodiments, the error range is a value that defines a boundary corresponding to a maximum possible margin of error for each dimension, axis, parameters, or perspective of a coordinate system or of a predetermined path used to indicate a location of the first communication node. In the example in which the location of the first communication node is defined using three axes (e.g., of the spherical coordinate system, the Cartesian coordinate system, longitude/latitude/height, or coordinate systems similar thereto), the error range includes a first value that indicates a first maximum possible margin of error within one plane (defined by two dimensions, axes, parameters, or perspectives). The first value corresponds to a length of a radius or diameter, and the boundary corresponds to a circle having a center at the location of the first communication node (the location being indicated by the parameters of the coordinate system, the combination of the longitude, latitude, and height, or the predetermined path) and the radius or diameter. The error range further includes a second value that indicates a second maximum possible margin of error along an remaining dimension, axis, parameter, or perspective, where the remaining dimension, axis, parameter, or perspective is orthogonal to the plane. In some example, the plane refers to a plane constructed by two axes in a coordinate system, such as the longitude and the latitude, and height. The remaining axis corresponds to the height. The locations within a cylinder (defined by the plane and the remaining axis) are within the maximum possible margin of error.

In some embodiments, the variation rate refers to variation of the location of the first communication node (the location being indicated by the parameters of the coordinate system, the combination of the longitude, latitude, and height, or the predetermined path) in the cases in which the error associated with the location is time-variant.

In some embodiments, the valid time duration indicates a time interval within which the location of the first communication node (the location being indicated by the parameters of the coordinate system, the combination of the longitude, latitude, and height, or the predetermined path) and/or the error range/variation rate associated therewith are deemed to be valid, for example, before an update is needed. In some embodiments, in response to the second communication node determines that the valid time duration associated with a previously obtained location of the first communication node has expired, the second communication node obtains an updated location of the first communication node, for example, at 110*a*, using any suitable methods described herein, including, for example, receiving the status information transmitted by the first communication node at 110*b*.

In some embodiments, the update periodicity is a periodicity for updates and refers to one of a periodicity by which the status information is transmitted from the first communication node, or a periodicity by which the second communication node reacquires the status information.

In some embodiments, the mobility status includes one or more of a velocity of the first communication node or a general status of the first communication node. The velocity of the first communication node includes, with respect to the movement of the first communication node, a speed of the first communication node and a direction of the first communication node at a given point in time. In some examples in which the first communication node is a satellite, the velocity of first communication node may be determined in advance and correspond to each of the predetermined locations of the first communication node along the predetermined path. In some examples in which the first communication node is a HAPS, the first communication node transmits the velocity of the first communication node to the second communication node.

The general status of the first communication node includes a classification or characteristics of the first communication node. Some examples of the general status include but are not limited to, "stationary," "moving," and "quasi-stationary." Other examples of the general status include but are not limited to, a stationary communication node (e.g., a traditional terrestrial BS), a HAPS indication, a satellite.

In some embodiments, the mobility status information for the first communication node that is a LEO satellite is not obtained by the second communication node at 110*a* and/or not transmitted by the first communication node at 110*b*. As such, in some embodiments, the mobility status information is only indicated within the status information for certain type(s) of communication nodes (e.g., HAPS or stationary communication node) while not indicated within the status information for other type(s) of communication nodes (e.g., LEO satellites).

In some arrangements, the second communication nodes communicating with the first communication node based on the status information (at 120*a*) includes (1) determining one or more of Doppler's effect, timing advance, or other suitable communication parameters relative to the signals communicated between the first communication node and the second communication node, and (2) transmitting signals to and receiving signals from the first communication node based on the one or more of the determined Doppler's effect, timing advance, or other suitable communication parameters, to communicate information correctly. In that regard, the first communication node communicating with the second communication node based on the status information (at 120*b*) includes transmitting signals to and receiving signals from the second communication node based on the one or more of the determined Doppler's effect, timing advance, or other suitable communication parameters, to communicate information correctly.

In some embodiments, the first communication node transmits the status information related to the first communication node to the second communication node (e.g., at 110*b*) by signaling the status information to multiple Type-B communication nodes (including the second communication node) via signaling, for example, via one or more of system information (e.g., one or more SIBs) or configuration signaling (e.g., Radio Resource Control (RRC) signaling). The second communication node obtains the status information related to the first communication node (e.g., at 110*a*) by receiving the signaled status information. In some examples, the signaling includes system information such as but not limited to, one or more of System Information Blocks (SIBs). The one or more SIBs correspond to different types of the first communication node.

In some embodiments, the system information refers to different signaling (e.g., different SIBs) that correspond to different types of the first communication node. Examples of the types of the first communication node include but are not limited to, satellite, HAPS, stationary communication node, and so on. For example, a first SIB (e.g., SIB-i) contains the status information for satellite, a second SIB (e.g., SIB-j) for HAPS, a third SIB for the stationary communication node, and so on. In such an example, three different SIBs are used to support three different types of the first communication node. The first communication node signals the status information using the SIB that is dedicated for containing the status information for the type that the first communication node belongs. In the example in which the first communication node is a satellite, the first communication node uses the first SIB (e.g., SIB-j) to signal (e.g., broadcast) its status information to Type-B communication nodes. The different signaling can include a same type of signaling (e.g., different SIBs) or different types of signaling (e.g., one or more SIBs and RRC signaling). In the embodiments in which the different signaling includes different types of signaling, the different types of signaling can correspond to different types of the first communication node. For example, the a first type of signaling (e.g., SIB(s)) can be used for a first type of the first communication node (e.g., satellite) and a second type of signaling (e.g., RRC) can be used for a second type of the first communication node (e.g., HAPS).

In some examples, the second communication node lacks prior knowledge of the type of the first communication node. In this case, obtaining the status information at 110*a* further includes blind detecting, by the second communication node, all of the different signaling, e.g., all of the different SIBs (e.g., SIB-i to SIB-x) with corresponding suitably defined or supported content/format.

In some examples, the second communication node has prior knowledge of a type of the first communication node, for example, based on one of previous signaling from the first communication node, separate frequency list/cell, Public Land Mobile Network (PLMN) arrangement, cell identifiers (IDs), or so on. In this case, obtaining the status information further at 110*a* includes detecting, by the second communication node, one of the different signaling e.g., one of the different SIBs corresponding to the type of the first communication node.

In some examples, the second communication node is capable of supporting or dedicated to services from communications with one or more types of the first communication node. In this case, obtaining the status information at 110*a* further includes detecting, by the second communication node, the different signaling (e.g., the different SIBs) corresponding to the one or more types of the first communication node supported by or dedicated to the second communication node.

In some embodiments, the system information refers to same signaling (e.g., one SIB) that corresponds to the different types of the first communication node. That is, a same SIB (e.g., SIB-i) is used for all types of the first communication node, where different interpretations of the content contained in that SIB can be realized.

In some examples, the second communication node lacks prior knowledge of the type of the first communication node. In this case, obtaining the status information at 110*a* further includes blind detecting, by the second communication node, this signaling based on different assumptions. The different assumptions correspond to different types of the first communication node and different content formats of the status information. That is, the second communication node attempts to decode the same signaling (e.g. the same SIB) by assuming that the status information corresponds to a first type of the first communication node and/or content format (associated with the first type of first communication node). In response to the attempt failing, the second communication node attempts to decode the same signaling (e.g. the same SIB) by assuming that the status information corresponds to a second type of the first communication node and/or content format (associated with the second type of first communication node), and so on.

In some examples, the second communication node has prior knowledge of a type of the first communication node, for example, based on one of previous signaling from the first communication node, separate frequency list/cell, Public Land Mobile Network (PLMN) arrangement, cell identifiers (IDs), or so on. In this case, obtaining the status information further at 110*a* includes detecting, by the second communication node, the signaling corresponding to the type of the first communication node.

In some examples, the second communication node is capable of supporting or dedicated to services from communications with one or more types of the first communication node. In this case, obtaining the status information at 110*a* further includes detecting, by the second communication node, the signaling corresponding to the one or more types of the first communication node supported by or dedicated to the second communication node.

In some embodiments, the first communication node can implement a two-step signaling process in which a first, prior signaling informs the second communication node of one or more potential types of the first communication node, and a second, later signaling (e.g., at 110*b*) informs the second communication node the status information. The second communication node receives both signaling, for example, in block 110*a*, and attempts to decode the content of the second signaling (e.g., the status information) using the one or more potential types of the first communication node received via the first signaling.

In that regard, in some examples, the first communication node transmits, and the second communication node receives, indication information in the first signaling. The system information and the indication information can be sent simultaneously or sequentially (the indication information is sent before the indication information is sent) to the second communication node. The second communication node decodes the indication information before decoding the status information in either case.

In some examples, the indication information directly indicates a type of the first communication node. The indication information indicates, for example, "HAPS," "satellite," or "Status Unavailable." In response to the second communication node determining that the indication information corresponds to "Status Unavailable," the second communication node does not attempt to decode the field corresponding to the status information in the second signaling.

In some examples, the indication information can include a bit field and indirectly indicates the type of the first communication node using the bit field. The bit field has a predetermined number (e.g., X) of bits. The predetermined number X can be determined using expression (1), below:

$$X = \text{ceil}(\log_2 \text{NumOfTypes}) \quad (1).$$

NumOfTypes is a parameter indicating a total number of possible types of the first communication node. The correspondence between bits and the types of the first communication node can be predefined. An example bit field 300 and information corresponding each combination of the bits in the bit field 300 is shown in FIG. 3. As shown, different combination of the bits in the bit field 300 are mapped to different types of the first communication node (e.g., satellite/Mode-1, HAPS/Mode-2, or Status-Unavailable).

In some embodiments, instead of the two-step signaling process, an indication of the type of the first communication device is included in the same signaling (e.g., the same SIB) of the status information. For example, within the SIB, a bit-field (e.g., the bit filed 300) is included. The second communication node blind decodes the bit field responsive to receiving the SIB.

Within the same SIB, the bit field can be separately encoded or jointly encoded with the status information. In other words, the single SIB contains the bit field encoded with the status information, where the bits in the bit field are mapped to different types of the first communication node, in the manner similar to described with reference to the bit field 300.

In some embodiments, the type of the first communication node can be stored in a suitable storage device (e.g., the SIM, USIM, or another suitable storage device) of the second communication device. Accordingly, the second communication device can determine the type of the first communication node according to information pre-stored in the second communication node.

In some cases, the second communication node (e.g., a Type-B communication node) is connected to a third communication node (e.g., a Type-A communication node) and is establishing connection with the first communication node (e.g., another Type-A communication node), for example, in a handover or a dual-connectivity establishment. In this case, the second communication node obtains the status information at 110*a* by receiving, from the first communication node, the status information via unicast. Likewise, in this case, the first communication node transmits the status information at 110*b* by transmitting, to the second communication node, the status information via unicast.

Figure 4A:
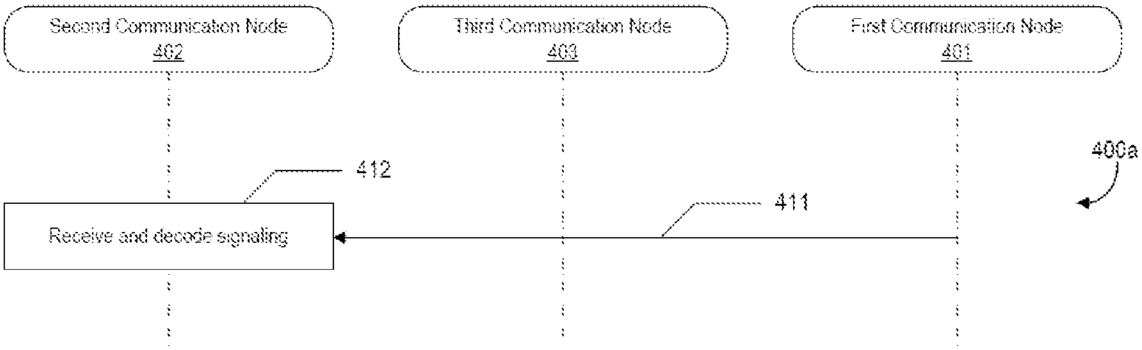
FIG. 4A is a signaling diagram illustrating a method for communicating status information, according to some embodiments of the present disclosure

FIG. 4A is a signaling diagram illustrating a method 400*a* of communicating status information, according to some embodiments of the present disclosure. Referring to FIGS. 1A-4A, the method 400*a* is an example implementation of blocks 110*a* and 110*b*. In the method 400*a*, a second communication node 402 directly decodes the status information (e.g., signaled in the manner described herein) from the first communication node 401 when establishing connection with the first communication node 401 in a handover or a dual-connectivity establishment. The second communication node 402 is connected to the third communication node 403. For example, at 411, the first communication node 401 sends signaling to the second communication node 402. The signaling includes status information of the first communication node 401. At 412, the second communication node 402 receives the signaling and decodes the signaling.

In some cases, the second communication node (e.g., a Type-B communication node) is connected to the first communication node (e.g., a Type-A communication node) and is establishing connection with a third communication node (e.g., another Type-A communication node), for example, in a handover or a dual-connectivity establishment. In this case, the second communication node obtains the status information at 110*a* by receiving, from the first communication node, the status information via unicast. Likewise, in this case, the first communication node transmits the status information at 110*b* by transmitting, to the second communication node, the status information via unicast.

Figure 4B:
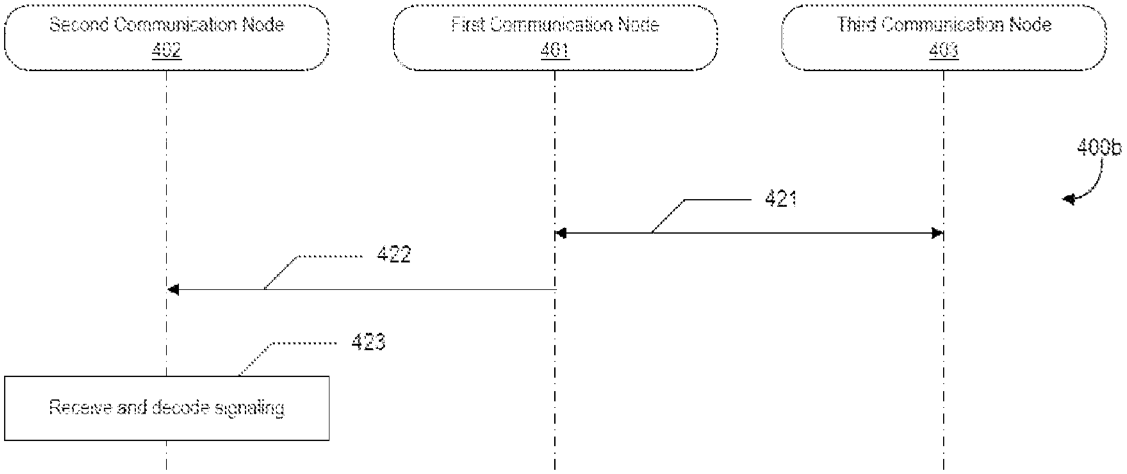
FIG. 4B is a signaling diagram illustrating a method of communicating status information, according to some embodiments of the present disclosure.

FIG. 4B is a signaling diagram illustrating a method 400*b* of communicating status information, according to some embodiments of the present disclosure. Referring to FIGS. 1A-4B, the method 400*b* is an example implementation of blocks 110*a* and 110*b*. In the method 400*b*, the first communication node 401 directly indicates the status information of the third communication node 403 to the first communication node 401, when the first communication node 401 is establishing connection with the third communication node 403 in a handover or a dual-connectivity establishment. The second communication node 402 is connected to the first communication node 401. For example, at 421, the third communication node 403 and the first communication node 401 perform signaling exchange, in which the third communication node 403 sends signaling to the first communication node 401 that indicates the information status of the third communication node 403. At 422, the first communication node 401 sends signaling to the second communication node 402, via unicast. The signaling includes status information of the third communication node 403. The second communication node 402 receives the status information from the first communication node 401 via unicast. At 423, the second communication node 402 receives the signaling and decodes the signaling, for example, based on format for known type of the third communication node 403.

In some cases, the second communication node (e.g., a Type-B communication node) is connected to the first communication node (e.g., a Type-A communication node) and is establishing connection with a third communication node (e.g., another Type-A communication node), for example, in a handover or a dual-connectivity establishment. In this case, the second communication node obtains the status information at 110*a* by receiving, from the first communication node, information indicating a type of the third communication node via unicast, and the second communication node receives the status information from the third communication node thereafter. Likewise, in this case, the first communication node transmits the status information at 110*b* by transmitting, to the second communication node, information indicating a type of the third communication node via unicast.

Figure 4C:
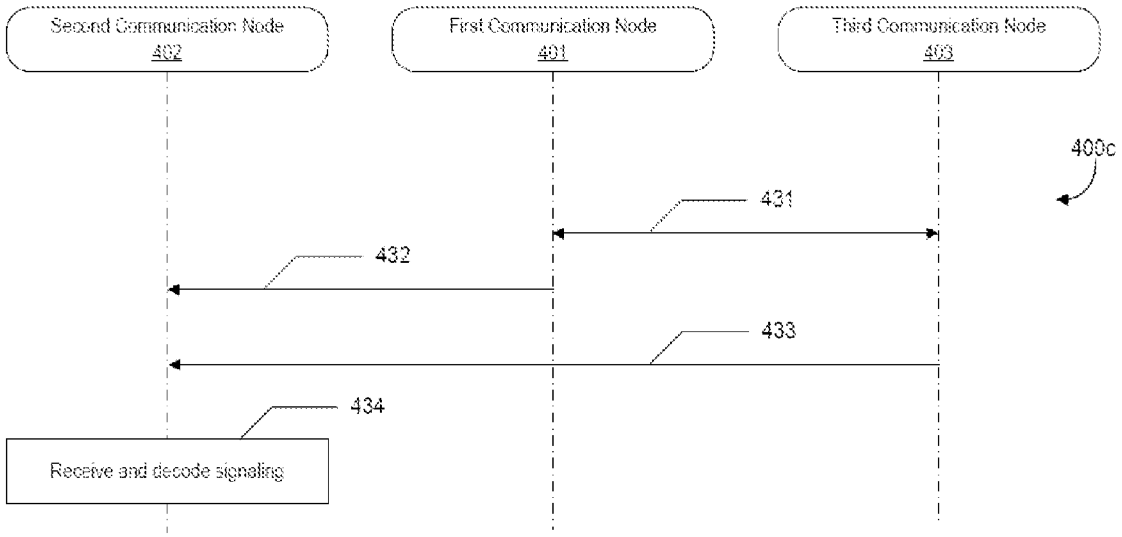
FIG. 4C is a signaling diagram illustrating a method of communicating status information, according to some embodiments of the present disclosure.

FIG. 4C is a signaling diagram illustrating a method 400*c* of communicating status information, according to some embodiments of the present disclosure. Referring to FIGS. 1A-4C, the method 400*c* is an example implementation of blocks 110*a* and 110*b*. In the method 400*c*, the first communication node 401 indicates the type of the third communication node 403 to the second communication node 402, when second communication node 402 is establishing connection with the third communication node 403 in a handover or a dual-connectivity establishment. The second communication node 402 is connected to the first communication node 401. For example, at 431, the third communication node 403 and the first communication node 401 perform signaling exchange, in which the third communication node 403 sends signaling to the first communication node 401 that indicates the type of the third communication node 403. At 432, the first communication node 401 sends signaling to the second communication node 402, via unicast, the signaling includes the type of the third communication node 403. The second communication node 402 receives the type information from the first communication node 401 via unicast. At 433, the third communication node 403 sends signaling to the second communication node 402, via unicast, where the signaling includes the status information of the third communication node 403. At 434 the second communication node 402 receives the signaling (corresponding to the status information) via unicast and decodes the signaling, for example, based on format for known type of the third communication node 403, where the known type is received at 432. In other words, the second communication node 402 can directly decode the status information received from the third communication node 403.

In some cases, the second communication node (e.g., a Type-B communication node) is connected to the third communication node (e.g., a Type-A communication node) and is establishing connection with a first communication node (e.g., another Type-A communication node), for example, in a handover or a dual-connectivity establishment. In this case, the second communication node obtains the status information at 110*a* by receiving, from the first communication node, the status information of the first communication node via unicast. Likewise, in this case, the first communication node transmits the status information at 110*b* by transmitting, to the second communication node, the status information of the first communication node via unicast.

Figure 4D:
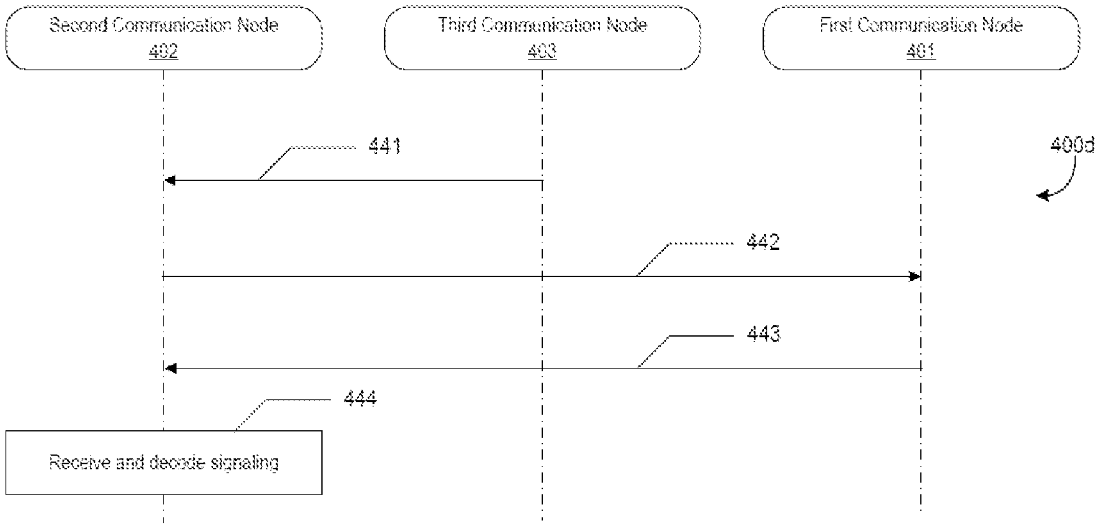
FIG. 4D is a signaling diagram illustrating a method of communicating status information, according to some embodiments of the present disclosure.

FIG. 4D is a signaling diagram illustrating a method 400*d* of communicating status information, according to some embodiments of the present disclosure. Referring to FIGS. 1A-4D, the method 400*d* is an example implementation of blocks 110*a* and 110*b*. In the method 400*d*, the third communication node 401 sends signaling to the second communication node 402, when the second communication node 402 is establishing connection with the first communication node 401 in a handover or a dual-connectivity establishment. The second communication node 402 is connected to the third communication node 403. For example, at 441, the third communication node 403 sends signaling to the second communication node 402, the signaling includes configuration information of the first communication node 401. At 442, the second communication node 402 sends signaling to the first communication node 401, the signaling includes signaling for connection establishment, which further includes a require for acquisition of status information of the first communication node 401. At 443, the first communication node 401 sends signaling to the second communication node 402, via unicast, where the signaling includes the status information of the first communication node 403. The status information is sent to the second communication node 402 responsive to the request for acquisition of the status information. At 444 the second communication node 402 receives the signaling (corresponding to the status information) and decodes the signaling.

In some embodiments, obtaining the status information at 110*a* includes storing, by the second communication node, at least a portion of the status information. That is, full or partial status information of the first communication node is stored in the second communication node, for example, in a Subscriber Identity Module (SIM), Universal SIM (USIM), or another suitable storage of the second communication node.

In some embodiments, the status information can be divided into more than one portion. In some examples, the location information can be one portion and the mobility information is another portion. In some examples, within the location information, parameters used to describe the location can be one portion and the accuracy information can be another portion. In some examples, for satellites, the orbit-level parameters can be one portion and satellite-level parameters can be another portion. In some examples, definition of the constellation or reference system for the location indication can be one portion and corresponding parameter(s) for location indication is another portion.

In some embodiments, full status information of the first communication node is stored by the second communication node for one or more types of the second communication node. In response to determining that the full status information is stored for the type of the first communication node (the full status information aligns with the first communication node that the second communication node is attempting to access), the second communication node can directly access the node without further action.

Figure 5A:
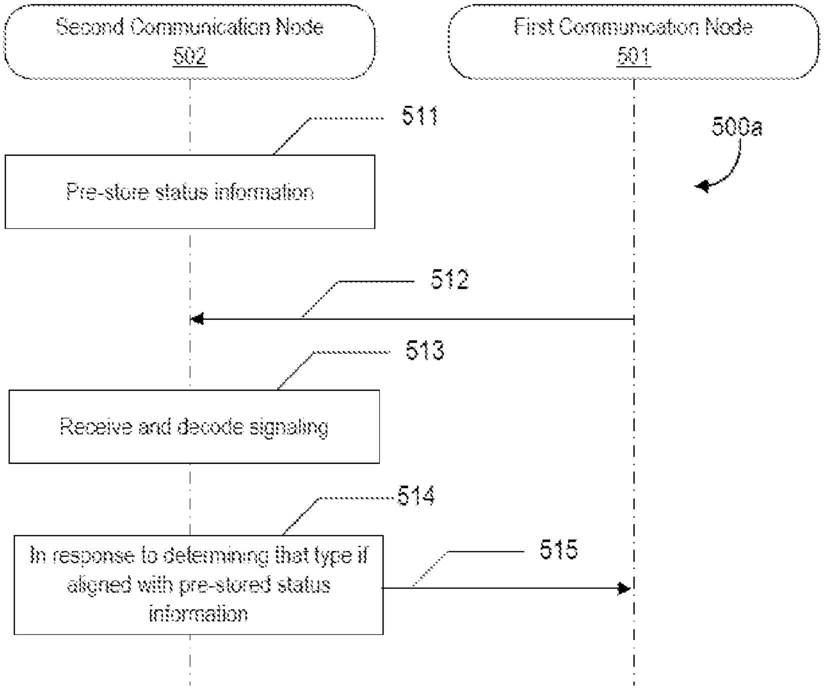
FIG. 5A is a signaling diagram illustrating a method of communicating based on status information, according to some embodiments of the present disclosure.

FIG. 5A is a signaling diagram illustrating a method 500*a* of communicating based on status information, according to some embodiments of the present disclosure. Referring to FIGS. 1A-3 and 5A, the method 500*a* is an example implementation of blocks 110*a* and 110*b*. In the method 500*a*, the second communication node 502 is establishing connection with the first communication node 501 in a handover or a connectivity establishment. At 511, the second communication node 502 stores the full status information of one or more types of the second communication node 502, e.g., in a suitable memory device as described. At 512, the first communication node 501 sends signaling to the second communication node 502, the signaling includes information indicating a type of the first communication node 501. At 513, the second communication node 502 receives the signaling (corresponding to the type of the first communication node 501) and decodes the signaling. At 514, in response to determining that the type of the first communication node 501 aligns with the pre-stored status information (e.g., the type of the first communication node 501 is one of the one or more types of first communication node stored by the second communication node 502) at 514, the second communication node 502 sends signaling corresponding to access/connection establishment, at 515.

In some embodiments, full status information of the first communication node is stored by the second communication node for one or more types of the second communication node. In response to determining that the full status information stored is not for the type of the first communication node (the full status information does not align with the first communication node that the second communication node is attempting to access), the second communication node can receive and decode the status information from the first communication node (e.g., in any suitable method described herein).

Figure 5B:
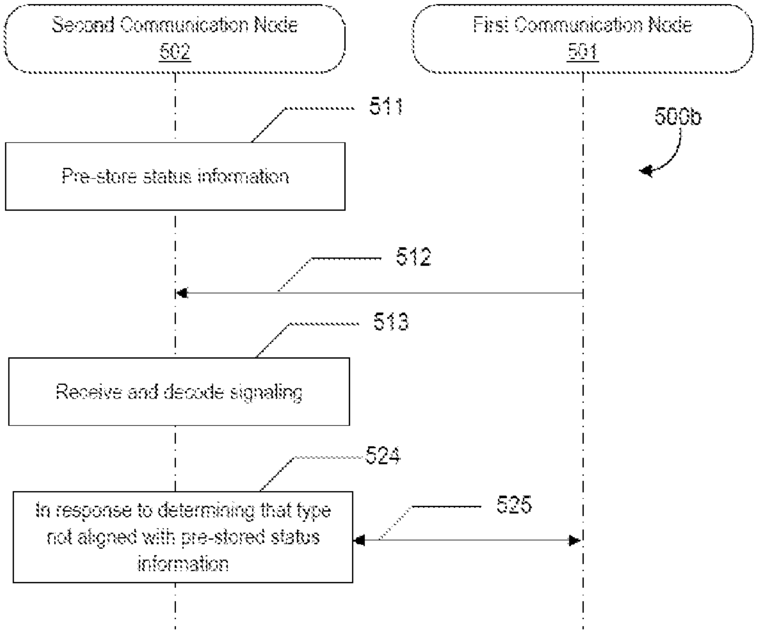
FIG. 5B is a signaling diagram illustrating a method of communicating based on status information, according to some embodiments of the present disclosure.

FIG. 5B is a signaling diagram illustrating a method 500*b* of communicating based on status information, according to some embodiments of the present disclosure. Referring to FIGS. 1A-3, 5A, and 5B, the method 500*b* is an example implementation of blocks 110*a* and 110*b*. In the method 500*b*, the second communication node 502 is establishing connection with the first communication node 501 in a handover or a connectivity establishment. Blocks 511-513 remain the same as those of FIG. 5A. At 524, in response to determining that the type of the first communication node 501 does not align with the pre-stored status information (e.g., the type of the first communication node 501 is not one of the one or more types of first communication node stored by the second communication node 502) at 524, the second communication node 502 acquires the status information by exchanging signals with the first communication node 501. For example, the second communication node 502 sends a request for acquisition of the status information of the first communication node 501 to the first communication node 501, and the second communication node 502 receives the status information from first communication node 501.

In some embodiments, partial status information of the first communication node is stored by the second communication node for one or more types of the second communication node. For instance, some location information (e.g., the predetermined path) for the first communication node that is a satellite or HAPS may be stored by the second communication node, but a remaining portion (e.g., the accuracy information or the mobility status such as velocity) of the first communication node is not. In response to determining that the partial status information stored is for the type of the first communication node (the partial status information aligns with the first communication node that the second communication node is attempting to access), the second communication node can receive and decode the remaining portion of the status information from the first communication node (e.g., in any suitable signaling method described herein). On the other hand, in response to determining that the partial status information stored is not for the type of the first communication node (the partial status information does not align with the first communication node that the second communication node is attempting to access), the second communication node can receive and decode the full status information from the first communication node (e.g., in any suitable signaling method described herein).

Figure 6A:
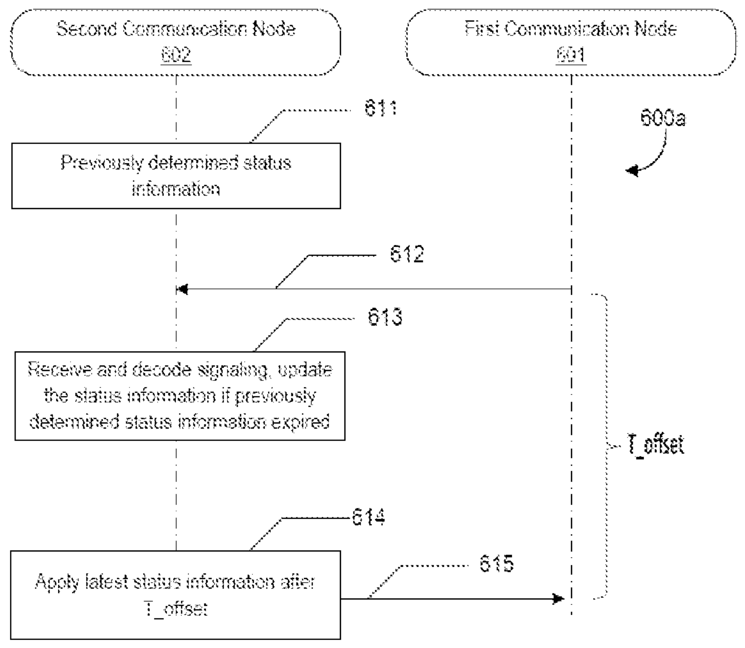
FIG. 6A is a signaling diagram illustrating a method for communicating status information, according to some embodiments of the present disclosure.

In some cases, the status information of the first communication node may change. In some embodiments, obtaining the status information at 110*a* includes periodically receiving, by the second communication node from the first communication node, updates to the status information. Likewise, transmitting the status information at 110*a* includes periodically transmitting, by the first communication node to the second communication node, updates to the status information. In that regard, FIG. 6A is a signaling diagram illustrating a method 600*a* for communicating status information, according to some embodiments of the present disclosure. Referring to FIGS. 1A-3, and 6A, the method 600*a* is an example implementation of blocks 110*a* and 110*b*. In the method 600*a*, the second communication node 602 has previously determined the status information (referred to as previous status information) of the first communication node 601, at 611. At 612, the first communication node 601 periodically sends signaling that includes status information of the first communication node 601 to the second communication node 602. In some examples, the periodicity by which the first communication node 601 sends signaling at 612 corresponds to (is the same as approximately the same as) the valid time duration of the status information. In some embodiments, the first communication node 601 can periodically signal the status information via one or more of system information (e.g., one or more SIBs) or configuration signaling (e.g., RRC signaling).

At 613, the second communication node 602 receives and decodes the signaling, and updates the status information in response to determining that the previously determined status information (e.g., the validity time duration associated thereto) has expired. In some examples, the status information conveyed at 612 includes an offset period (T_offset), which is defined as a time interval between an actual or expected time by which the second communication node 602 receives or decodes the signaling at 613 and an effective time by which the latest status information is expected to become valid. Therefore, at 614, the second communication node 602 applies the latest status information (decoded at 613) responsive to the end of the offset period (T_offset), and performs data/signaling transmission based on the latest status information, at 615.

Figure 6B:
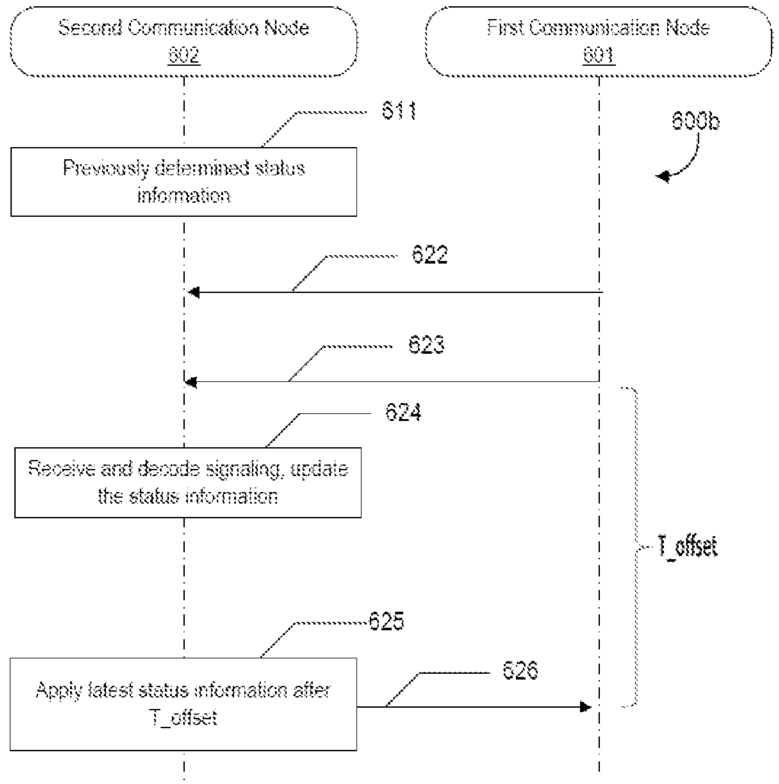
FIG. 6B is a signaling diagram illustrating a method for communicating status information, according to some embodiments of the present disclosure.

In some embodiments, the second communication node reacquires the status information in response to receiving an indication to update previous status information from the first communication device. The indication can be simple (e.g., via a one-bit signal). In that regard, FIG. 6B is a signaling diagram illustrating a method 600*b* for communicating status information, according to some embodiments of the present disclosure. Referring to FIGS. 1A-3, 6A, and 6B, the method 600*b* is an example implementation of blocks 110*a* and 110*b*. In the method 600*b*, the second communication node 602 has previously determined the previous status information of the first communication node 601, at 611, as described. At 622, the first communication node 601 signals to trigger update for the previous status information to the second communication node 602.

At 623, the first communication node 601 sends signaling that includes status information of the first communication node 601 to the second communication node 602. In some embodiments, the first communication node 601 can signal the status information via one or more of system information (e.g., one or more SIBs) or configuration signaling (e.g., RRC signaling). At 624, the second communication node 602 receives and decodes the signaling, and updates the status information. In some examples, the status information conveyed at 623 includes an offset period (T_offset), which is defined as a time interval between an actual or expected time by which the second communication node 602 receives or decodes the signaling at 624 and an effective time by which the latest status information is expected to become valid. Therefore, at 625, the second communication node 602 applies the latest status information (decoded at 613) responsive to the end of the offset period (T_offset), and performs data/signaling transmission based on the latest status information, at 626.

Figure 6C:
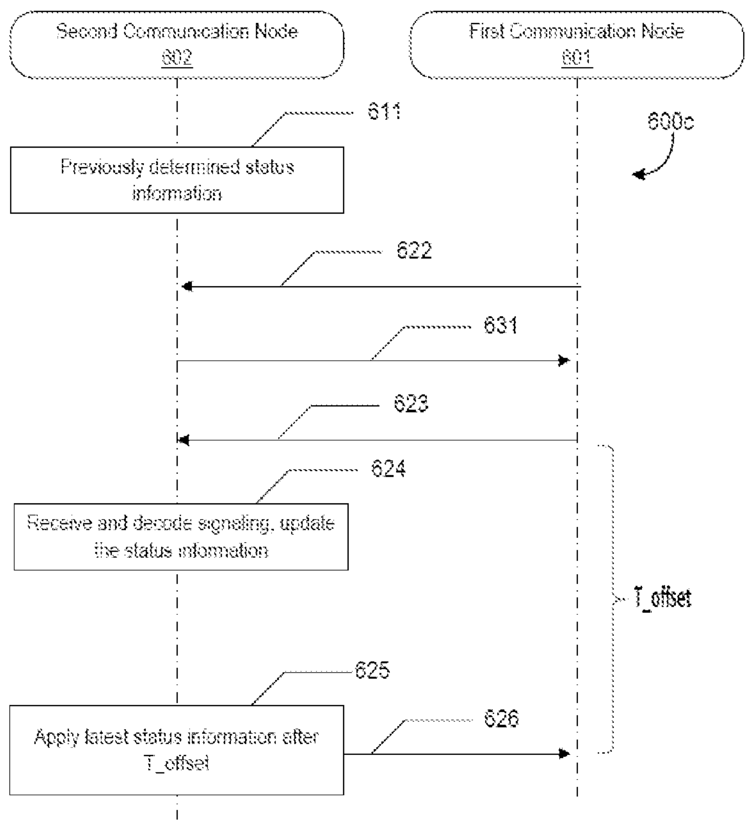
FIG. 6C is a signaling diagram illustrating a method for communicating status information, according to some embodiments of the present disclosure.

In some embodiments, the second communication node reacquires the status information by requesting the first communication device to update previous status information. The indication can be simple (e.g., via a one-bit signal). In that regard, FIG. 6C is a signaling diagram illustrating a method 600*c* for communicating status information, according to some embodiments of the present disclosure. Referring to FIGS. 1A-3, and 6A-6C, the method 600*c* is an example implementation of blocks 110*a* and 110*b* and is similar to blocks 611, 622, 623, 624, 625, and 626 of the method 600*b*. The method 600*c* includes signaling, by the second communication node 602 to the first communication node 601, to request the status information, at 631. The first communication node 601 sends the signaling including the status information at 623, responsive to receiving the request at 631.

In some embodiments, the second communication node receives from the first communication node, an indication of negative link condition. The link corresponding to the link condition refers to the connection that begins from the second communication node and ends at the first communication node. Examples of the link include the uplink link from the UE (the second communication node) to a BS (the first communication node). The second communication node reacquire, from the first communication node, updates to the status information in response to receiving the update indication. Examples of the negative link condition includes out-of-synchronization (e.g., the synchronization has failed with respect to the link), out-of-connection or failed (e.g., the link is broken or has poorer quality as compared to a certain threshold, for example, which can be based on Reference Signals Received Power (RSRP), Reference Signal Received Quality (RSRQ), or Signal-to-Interference-plus-Noise Ratio (SINR)).

In some embodiments, the valid time duration or timer for the status information can be the same for all parameters of the status information, or different parameters (e.g., the mobility status, the accuracy information, and the predetermined path) of the status information can have different valid time durations. In response to determining that the valid time duration has expired or exceeded for one or more parameters of the status information, the second communication node attempts to require the status information for those parameters, either by directly decoding the signaling received from the first communication node or by sending a request to the first communication node for updates.

In that regard, the second communication node can determine that the timer associated with the status information indicates that a valid duration associated with the status information (for some or all parameters thereof) has expired. In response to determining that the timer associated with the status information indicates that the valid duration has expired, the second communication node reacquires from the first communication node, updates to the status information (for some or all parameters thereof).

Figure 6D:
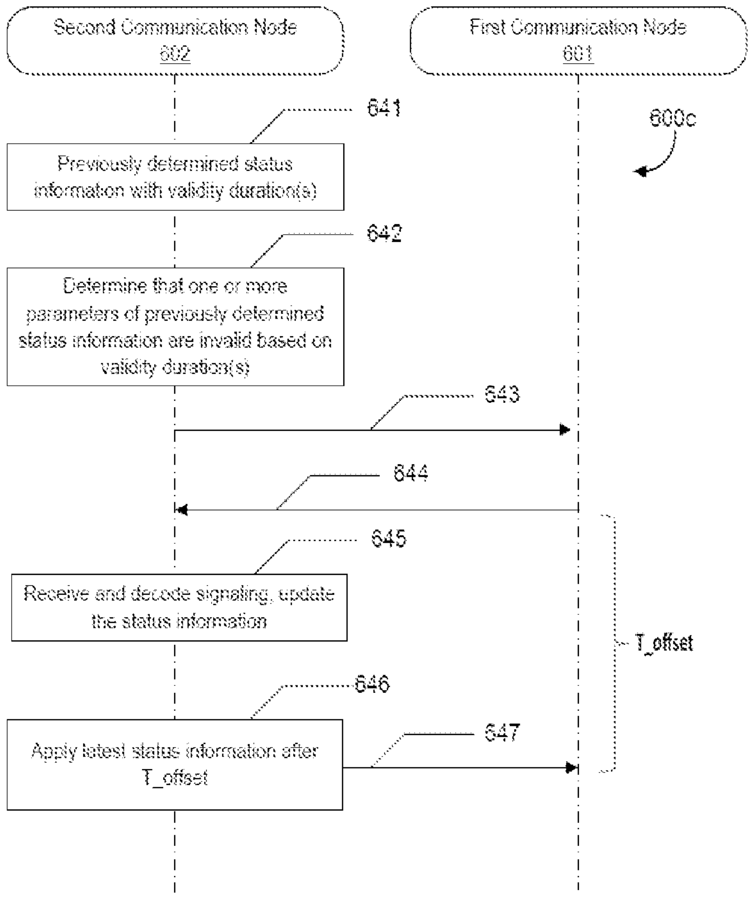
FIG. 6D is a signaling diagram illustrating a method for communicating status information, according to some embodiments of the present disclosure.

FIG. 6D is a signaling diagram illustrating a method 600*d* for communicating status information, according to some embodiments of the present disclosure. Referring to FIGS. 1A-3 and 6A-6D, the method 600*d* is an example implementation of blocks 110*a* and 110*b*. In the method 600*d*, the second communication node 602 has previously determined the previous status information of the first communication node 601, at 641. One or more valid durations are associated with the status information (e.g., associated with some or all parameters thereof). At 642, the second communication node 602 determines that one or more of the parameters of the previously determined status information are invalid based on the associated validity duration(s) expiring. At 643, the second communication node 602 signals to request update for the expired one or more parameters of the previous status information to the second communication node 602.

At 644, the first communication node 601 sends signaling that includes status information of the first communication node 601 to the second communication node 602. In some embodiments, the first communication node 601 can signal the status information via one or more of system information (e.g., one or more SIBs) or configuration signaling (e.g., RRC signaling). At 645, the second communication node 602 receives and decodes the signaling, and updates the status information. In some examples, the status information conveyed at 644 includes an offset period (T_offset), which is defined as a time interval between an actual or expected time by which the second communication node 602 receives or decodes the signaling at 645 and an effective time by which the latest status information is expected to become valid. Therefore, at 646, the second communication node 602 applies the latest status information (decoded at 645) responsive to the end of the offset period (T_offset), and performs data/signaling transmission based on the latest status information, at 647.

In some embodiments, for the second communication node to receive, decode, and apply the status information, the status information is obtained by the second communication node (at 110*a*) during an access procedure. Examples of the access procedure include but are not limited to, initial access, handover, information updates, and so on.

In some embodiments, for the second communication node to receive, decode, and apply the status information, the second communication node is capable of at least one of transmitting data to the first communication node or receiving data from the first communication mode, as long as the second communication node is notified of the status information. In that regard, the second communication node has capabilities (in hardware and software) to handle communications with the type of the first communication node.

In some embodiments, for the second communication node to receive, decode, and apply the status information, the second communication node is authorized to obtain the status information from the first communication node. For example, the authorization can be completed using identify information allocated in the SIM/USIM card, International Mobile Subscriber Identity (IMSI), International Mobile Equipment Identity (IMEI), and so on.

In some embodiments, for the second communication node to receive, decode, and apply the status information, the second communication node stores at least a portion of the status information.

In some embodiments, for the second communication node to receive, decode, and apply the status information, the second communication node is free from access restriction with respect to the status information. That is, the second communication node is not within a black list or identified in access restriction configurations.

In some embodiments, the second communication node obtains the status information as the first communication node provides updates to the status information. In some examples, the first communication node and the second communication node are out-of-synchronization if the second communication node is unable to correctly decode data received from the first communication node, or the first communication node is unable to correctly decode data received from the second communication node. In this case, update of the status information may be needed.

Figure 7:
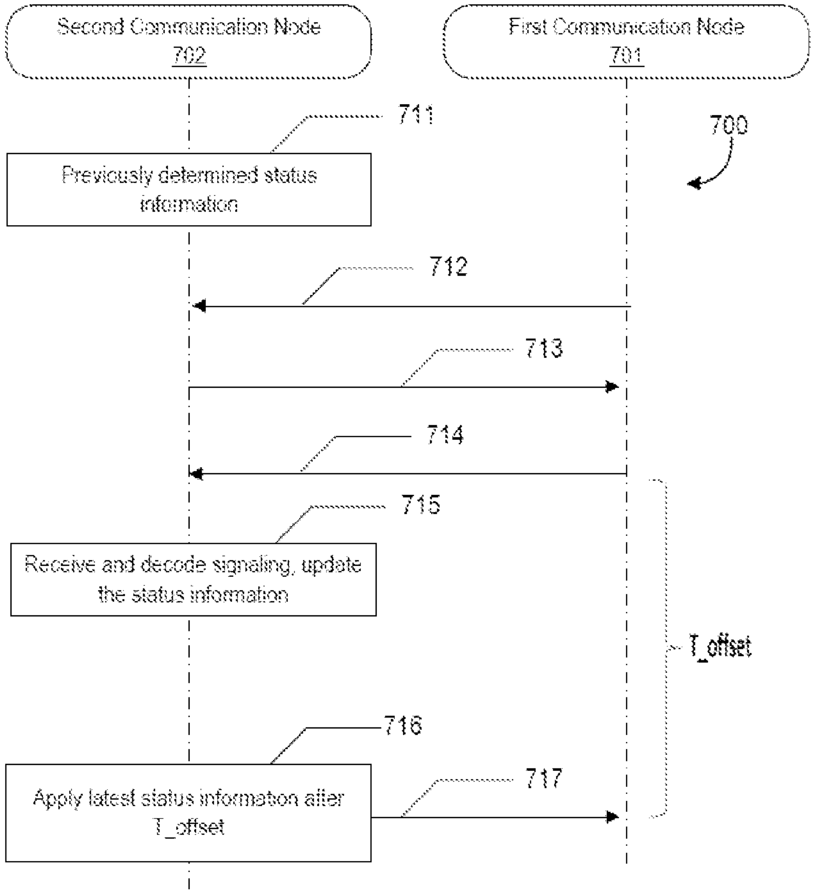
FIG. 7 is a signaling diagram illustrating a method for communicating status information, according to some embodiments of the present disclosure.

In that regard, FIG. 7 is a signaling diagram illustrating a method 700 for communicating status information, according to some embodiments of the present disclosure. Referring to FIGS. 1A-3, and 7, the method 700 is an example implementation of blocks 110*a* and 110*b*. In the method 700, the second communication node 702 has previously determined the previous status information of the first communication node 701, at 711, as described. At 712, the first communication node 701 signals to the second communication node 702 that the nodes 701 and 702 are out-of-synchronization.

At 713, the second communication node 702 sends signaling to the first communication node 701, to request the status information. The first communication node 701 sends the signaling including the status information at 714, responsive to receiving the request at 713.

At 715, the second communication node 602 receives and decodes the signaling, and updates the status information. In some examples, the status information conveyed at 714 includes an offset period (T_offset), which is defined as a time interval between an actual or expected time by which the second communication node 702 receives or decodes the signaling at 715 and an effective time by which the latest status information is expected to become valid. Therefore, at 716, the second communication node 702 applies the latest status information (decoded at 715) responsive to the end of the offset period (T_offset), and performs data/signaling transmission based on the latest status information, at 717.

As shown, the offset period (T_offset) is a time interval defined by a first time tag and a second time tag. The first time tag corresponds to a time at which the status information of the first communication node is obtained (including, for example, the behaviors of initial acquisition, updates, and so on). The second time tag corresponds to a time at which the status information is applied for communications between the first and second communication nodes. Examples of application for the communications include, for example, blocks 120*a* and 120*b* (e.g., the determination of the Doppler's effect, timing advance, and so on based on the updated status information).

In some embodiments, the offset period (T_offset) is set to zero or ignored in one of initial access, periodic reception of the status information without changes (the second communication node decoding the signaling periodically, but the content remains the same as compared to that included in the previous signaling), or only the accuracy information is updated.

Figure 8A:
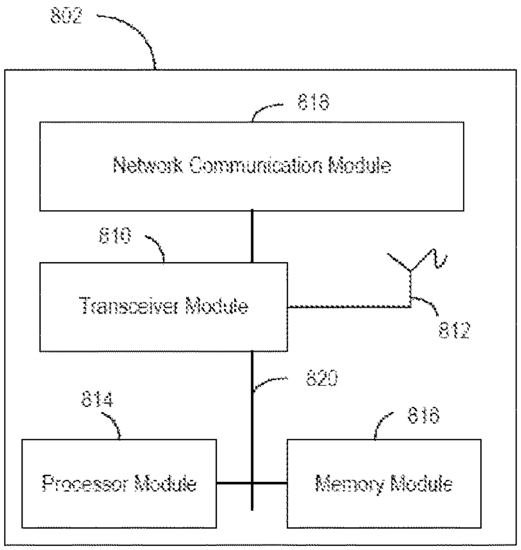
FIG. 8A illustrates a block diagram of an example base station, in accordance with some embodiments of the present disclosure.
Figure 8B:
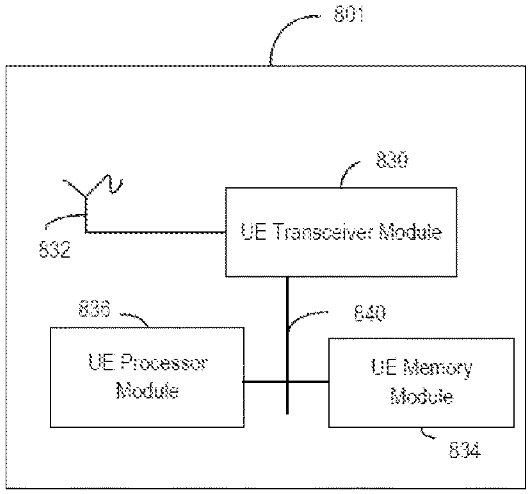
FIG. 8B illustrates a block diagram of an example UE, in accordance with some embodiments of the present disclosure.

FIG. 8A illustrates a block diagram of an example base station 802 (e.g., the first, second, or third communication node), in accordance with some embodiments of the present disclosure. FIG. 8B illustrates a block diagram of an example UE 801 (e.g., the second communication node), in accordance with some embodiments of the present disclosure. Referring to FIGS. 1-8B, the UE 801 (e.g., a wireless communication device, a terminal, a mobile device, a mobile user, and so on) is an example implementation of the UEs described herein, and the base station 802 is an example implementation of the base station described herein.

The base station 802 and the UE 801 can include components and elements configured to support known or conventional operating features that need not be described in detail herein. In one illustrative embodiment, the base station 802 and the UE 801 can be used to communicate (e.g., transmit and receive) data symbols in a wireless communication environment, as described above. For instance, the base station 802 can be a base station (e.g., gNB, eNB, and so on), a server, a node, or any suitable computing device used to implement various network functions.

The base station 802 includes a transceiver module 810, an antenna 812, a processor module 814, a memory module 816, and a network communication module 818. The module 810, 812, 814, 816, and 818 are operatively coupled to and interconnected with one another via a data communication bus 820. The UE 801 includes a UE transceiver module 830, a UE antenna 832, a UE memory module 834, and a UE processor module 836. The modules 830, 832, 834, and 836 are operatively coupled to and interconnected with one another via a data communication bus 840. The base station 802 communicates with the UE 801 or another base station via a communication channel, which can be any wireless channel or other medium suitable for transmission of data as described herein.

As would be understood by persons of ordinary skill in the art, the base station 802 and the UE 801 can further include any number of modules other than the modules shown in FIGS. 8A and 8B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 830 includes a radio frequency (RF) transmitter and a RF receiver each including circuitry that is coupled to the antenna 832. A duplex switch (not shown) may alternatively couple the RF transmitter or receiver to the antenna in time duplex fashion. Similarly, in accordance with some embodiments, the transceiver 810 includes an RF transmitter and a RF receiver each having circuitry that is coupled to the antenna 812 or the antenna of another base station. A duplex switch may alternatively couple the RF transmitter or receiver to the antenna 812 in time duplex fashion. The operations of the two-transceiver modules 810 and 830 can be coordinated in time such that the receiver circuitry is coupled to the antenna 832 for reception of transmissions over a wireless transmission link at the same time that the transmitter is coupled to the antenna 812. In some embodiments, there is close time synchronization with a minimal guard time between changes in duplex direction.

The UE transceiver 830 and the transceiver 810 are configured to communicate via the wireless data communication link, and cooperate with a suitably configured RF antenna arrangement 812/832 that can support a particular wireless communication protocol and modulation scheme. In some illustrative embodiments, the UE transceiver 810 and the transceiver 810 are configured to support industry standards such as the Long Term Evolution (LTE) and emerging 5G standards, and the like. It is understood, however, that the present disclosure is not necessarily limited in application to a particular standard and associated protocols. Rather, the UE transceiver 830 and the base station transceiver 810 may be configured to support alternate, or additional, wireless data communication protocols, including future standards or variations thereof.

The transceiver 810 and the transceiver of another base station (such as but not limited to, the transceiver 810) are configured to communicate via a wireless data communication link, and cooperate with a suitably configured RF antenna arrangement that can support a particular wireless communication protocol and modulation scheme. In some illustrative embodiments, the transceiver 810 and the transceiver of another base station are configured to support industry standards such as the LTE and emerging 5G standards, and the like. It is understood, however, that the present disclosure is not necessarily limited in application to a particular standard and associated protocols. Rather, the transceiver 810 and the transceiver of another base station may be configured to support alternate, or additional, wireless data communication protocols, including future standards or variations thereof.

In accordance with various embodiments, the base station 802 may be a base station such as but not limited to, an eNB, a serving eNB, a target eNB, a femto station, or a pico station, for example. The base station 802 can be an RN, a regular, a DeNB, or a gNB. In some embodiments, the UE 801 may be embodied in various types of user devices such as a mobile phone, a smart phone, a personal digital assistant (PDA), tablet, laptop computer, wearable computing device, etc. The processor modules 814 and 836 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 814 and 836, respectively, or in any practical combination thereof. The memory modules 816 and 834 may be realized as RAM memory, flash memory, ROM memory, EPROM memory, EEPROM memory, registers, a hard disk, a removable disk, a CD-ROM, or any other form of storage medium known in the art. In this regard, memory modules 816 and 834 may be coupled to the processor modules 810 and 830, respectively, such that the processors modules 810 and 830 can read information from, and write information to, memory modules 816 and 834, respectively. The memory modules 816 and 834 may also be integrated into their respective processor modules 810 and 830. In some embodiments, the memory modules 816 and 834 may each include a cache memory for storing temporary variables or other intermediate information during execution of instructions to be executed by processor modules 810 and 830, respectively. Memory modules 816 and 834 may also each include non-volatile memory for storing instructions to be executed by the processor modules 810 and 830, respectively.

The network communication module 818 generally represents the hardware, software, firmware, processing logic, and/or other components of the base station 802 that enable bi-directional communication between the transceiver 810 and other network components and communication nodes in communication with the base station 802. For example, the network communication module 818 may be configured to support internet or WiMAX traffic. In a deployment, without limitation, the network communication module 818 provides an 802.3 Ethernet interface such that the transceiver 810 can communicate with a conventional Ethernet based computer network. In this manner, the network communication module 818 may include a physical interface for connection to the computer network (e.g., Mobile Switching Center (MSC)). In some embodiments, the network communication module 818 includes a fiber transport connection configured to connect the base station 802 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for wireless communication between a first communication node and a second communication node, comprising:

obtaining, by the second communication node, information related to the first communication node, the first communication node comprising a base station and the second communication node comprising a user equipment (UE), wherein the information identifies a type of the first communication node and comprises status information comprising one or more parameters for at least one of location information of the first communication node or mobility status of the first communication node, and wherein obtaining the information comprises:

receiving, by the second communication node, first signaling from the first communication node identifying the type of the first communication node via a bit field, comprising two or more bits, the bit field mapped to a plurality of communication node types; and receiving, by the second communication node, second signaling from the first communication node including the one or more parameters, the second signaling comprising one or more of system information signaling via a system information block (SIB), or configuration signaling via a radio resource control (RRC) signaling, the second signaling decoded according to the type of the first communication node indicated in the first signaling.

2. The method of claim 1, wherein the one or more parameters for the location information comprises at least one of:

a location of the first communication node expressed in parameters of a coordinate system;

the location of the first communication node expressed in longitude, latitude, and height;

a predetermined path along which the first communication node is configured to move; or accuracy information, wherein the accuracy information comprises at least one of an error range, variation rate, a valid time duration, or update periodicity.

3. The method of claim 1, wherein the mobility status comprises at least one of:

a velocity of the first communication node; or a general status of the first communication node.

4. The method of claim 1, wherein the information corresponds to different signaling corresponding to the plurality of communication node types of the first communication node, the different signaling corresponding to different types of SIBs; and at least one of:

the second communication node lacks prior knowledge of the type of the first communication node, and obtaining the status information further comprises blind detecting, by the second communication node, all of the different signaling; or the second communication node has the prior knowledge of the type of the first communication node, and obtaining the status information further comprises detecting, by the second communication node, one of the different signaling corresponding to the type of the first communication node; or the second communication node is capable of supporting communications with one or more types of the first communication node, and obtaining the status information further comprises detecting, by the second communication node, different signaling corresponding to the one or more types of the first communication node.

5. The method of claim 1, wherein the information corresponds to same signaling corresponding to the plurality of communication node types of the first communication node, the same signaling corresponding to a same type of SIB; and at least one of:

the second communication node lacks prior knowledge of the type of the first communication node, and obtaining the status information further comprises blind detecting, by the second communication node, the second signaling with different assumption;

the second communication node has the prior knowledge of the type of the first communication node, and obtaining the status information further comprises detecting, by the second communication node, the second signaling corresponding to the type of the first communication node; or the second communication node is capable of supporting communications with one or more types of the first communication node, and obtaining the status information further comprises detecting, by the second communication node, the second signaling corresponding to the one or more types of the first communication node.

6. The method of claim 1, wherein the second communication node is connected to the first communication node and is establishing connection with a third communication node; and at least one of:

obtaining the status information comprises receiving, by the second communication node from the first communication node, the status information via unicast; or obtaining the status information comprises receiving, by the second communication node from the first communication node, information indicating a type of the third communication node via unicast.

7. The method of claim 1, wherein obtaining the status information comprises storing, by the second communication node, at least a portion of the status information.

8. The method of claim 7, further comprising determining, by the second communication node, that the status information corresponds to a type of the first communication node, the at least the portion of the status information comprises full status information.

9. The method of claim 7, further comprising:

determining, by the second communication node, that the status information corresponds to the type of the first communication node, the at least the portion of the status information comprises a first portion of the status information; and receiving, by the second communication node from the first communication node, a remaining portion of the status information.

10. The method of claim 1, wherein obtaining the status information comprises periodically receiving, by the second communication node from the first communication node, updates to the status information.

11. The method of claim 1, wherein obtaining the status information comprises:

receiving, by the second communication node from the first communication node, an update indication; and in response to receiving the update indication, re-acquiring, by the second communication node from the first communication node, updates to the status information.

12. The method of claim 1, wherein obtaining the status information comprises:

receiving, by the second communication node from the first communication node, an indication of negative link condition, the negative link condition comprising at least one of an out-of-synchronization condition, an out-of-connection condition, or a link failed condition; and in response to receiving the indication of the negative link condition, re-acquiring, by the second communication node from the first communication node, updates to the status information.

13. The method of claim 1, wherein obtaining the status information comprises:

determining, by the second communication node, that a timer associated with the status information indicates that a valid duration associated with the status information has expired; and in response to determining that the timer associated with the status information indicates that the valid duration has expired, re-acquiring, by the second communication node from the first communication node, updates to the status information.

14. The method of claim 1, wherein the status information is obtained by the second communication node during an access procedure.

15. The method of claim 14, wherein at least one of:

the second communication node is capable of at least one of transmitting data to the first communication node or receiving data from the first communication node;

the second communication node is authorized to obtain the status information from the first communication node;

the second communication node stores at least a portion of the status information;

the second communication node is free from access restriction with respect to the status information; or the second communication node obtains the status information as the first communication node provides updates to the status information.

16. A wireless communication method for wireless communication between a first communication node and a second communication node, comprising:

transmitting, by the first communication node to the second communication node, information related to the first communication node, the first communication node comprising a base station and the second communication node comprising a user equipment (UE), wherein the information identifies a type of the first communication node and comprises status information comprising one or more parameters for at least one of location information of the first communication node or mobility status of the first communication node, and wherein transmitting the information comprises:

transmitting, by the first communication node, first signaling identifying the type of the first communication node via a bit field, comprising two or more bits, the bit field mapped to a plurality of communication node types; and transmitting, by the first communication node, second signaling including the one or more parameters, the second signaling comprising at least one of system information signaling via a system information block (SIB), or radio resource control (RRC) signaling for common configuration signaling, the second signaling decoded by the second communication node according to the type of the first communication node indicated in the first signaling.

17. A second communication node comprising a user equipment (UE), the second communication node comprising:

at least one processor configured to:

obtain information related to a first communication node comprising a base station, wherein the information identifies a type of the first communication node and comprises status information comprising one or more parameters for at least one of location information of the first communication node or mobility status of the first communication node, and wherein to obtain the information, the at least one processor is configured to:

receive, via a receiver, first signaling from the first communication node identifying the type of the first communication node via a bit field, comprising two or more bits, the bit field mapped to a plurality of communication node types; and receive, via the receiver, second signaling from the first communication node including the one or more parameters, the second signaling comprising one or more of system information signaling via a system information block (SIB), or configuration signaling via a radio resource control (RRC) signaling, the second signaling decoded according to the type of the first communication node indicated in the first signaling.

18. A first communication node comprising a base station, the first communication node comprising:

at least one processor configured to:

transmit, via a transmitter to a second communication node comprising a user equipment (UE), information related to the first communication node, wherein the information identifies a type of the first communication node and comprises status information comprising one or more parameters of at least one of location information of the first communication node or mobility status of the first communication node, and wherein to transmit the information, the at least one processor is configured to:

transmit, via the transmitter, first signaling identifying the type of the first communication node via a bit field, comprising two or more bits, the bit field mapped to a plurality of communication node types; and transmit, via the transmitter to a plurality of second communication nodes, second signaling including the one or more parameters, the second signaling comprising at least one of system information signaling via a system information block (SIB), or radio resource control (RRC) signaling for common configuration signaling, the plurality of second communication nodes comprising the second communication node, the second signaling decoded according to the type of the first communication node indicated in the first signaling.

* * * * *